(12) United States Patent
Turgeon et al.

(10) Patent No.: US 10,454,145 B2
(45) Date of Patent: Oct. 22, 2019

(54) ELECTRIC VEHICLE BATTERY THERMOCOUPLE

(71) Applicant: Ford Global Technologies, LLC, Dearborn, MI (US)

(72) Inventors: Thomas Joseph Turgeon, Riverview, MI (US); Masahiro Kimoto, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 373 days.

(21) Appl. No.: 15/409,638

(22) Filed: Jan. 19, 2017

(65) Prior Publication Data
US 2017/0133730 A1    May 11, 2017

Related U.S. Application Data

(62) Division of application No. 14/056,204, filed on Oct. 17, 2013, now Pat. No. 9,583,798.

(51) Int. Cl.
| G01K 7/08 | (2006.01) |
| H01M 10/48 | (2006.01) |
| G01K 7/02 | (2006.01) |
| G01K 13/00 | (2006.01) |
| H01M 2/20 | (2006.01) |
| H01M 2/30 | (2006.01) |
| H01M 2/22 | (2006.01) |

(52) U.S. Cl.
CPC ............ *H01M 10/486* (2013.01); *G01K 7/02* (2013.01); *G01K 7/08* (2013.01); *G01K 13/00* (2013.01); *H01M 2/20* (2013.01); *H01M 2/206* (2013.01); *H01M 2/22* (2013.01); *H01M 2/30* (2013.01); *H01M 2/305* (2013.01); *H01M 10/48* (2013.01); *G01K 2217/00* (2013.01); *H01M 2220/20* (2013.01)

(58) Field of Classification Search
CPC .. G01K 7/02; G01K 7/08; G01K 7/04; G01K 13/00; G01K 7/00; G01K 7/023; G01K 17/00; G01K 7/06; G01K 2217/00; G01K 1/12; G01N 25/32; H01M 10/486
USPC .......................... 374/180, 163, 179, 141, 152
See application file for complete search history.

(56) References Cited

U.S. PATENT DOCUMENTS

| 5,441,344 A * | 8/1995 | Cook, III ................ A47J 43/28 374/141 |
| 5,741,072 A * | 4/1998 | Yamaguchi ............ G01K 7/023 136/232 |
| 6,352,793 B2 | 3/2002 | Kitoh et al. |
| 6,632,017 B1 | 10/2003 | Cress |
| 7,479,786 B2 | 1/2009 | Woo et al. |
| 8,802,275 B2 * | 8/2014 | Kim ...................... H01M 2/206 429/158 |

(Continued)

FOREIGN PATENT DOCUMENTS

| DE | 102010050997 | 5/2012 |
| DE | 102010055612 | 6/2012 |

(Continued)

*Primary Examiner* — Gail Kaplan Verbitsky
(74) *Attorney, Agent, or Firm* — Carlson, Gaskey & Olds, P.C.

(57) ABSTRACT

An example electric vehicle battery thermocouple includes a temperature sense lead of a first material, and an electric vehicle battery component of a second material different than the first material.

19 Claims, 4 Drawing Sheets

(56) References Cited

U.S. PATENT DOCUMENTS

| | | | |
|---|---|---|---|
| 9,583,798 B2* | 2/2017 | Turgeon | G01K 7/02 |
| 9,766,293 B2* | 9/2017 | Sims | H04Q 9/00 |
| 9,853,333 B2* | 12/2017 | Ramsayer | G01K 7/08 |
| 2003/0233099 A1 | 12/2003 | Danaek et al. | |
| 2011/0195615 A1 | 8/2011 | Falchetti | |
| 2013/0078487 A1 | 3/2013 | Shin et al. | |
| 2013/0200903 A1 | 8/2013 | Labbe et al. | |
| 2013/0224564 A1 | 8/2013 | Kim | |
| 2014/0295222 A1 | 10/2014 | Wang et al. | |
| 2015/0064526 A1* | 3/2015 | Ramsayer | G01K 7/08 |
| | | | 429/90 |
| 2017/0133730 A1* | 5/2017 | Turgeon | G01K 7/02 |
| 2018/0050599 A1* | 2/2018 | Sauer | G01K 7/08 |

FOREIGN PATENT DOCUMENTS

| | | |
|---|---|---|
| DE | 102011121485 | 1/2013 |
| JP | 9245824 | 9/1997 |
| KR | 20130048759 | 5/2013 |
| WO | 2011105095 | 9/2011 |
| WO | 2013143757 | 10/2013 |

* cited by examiner

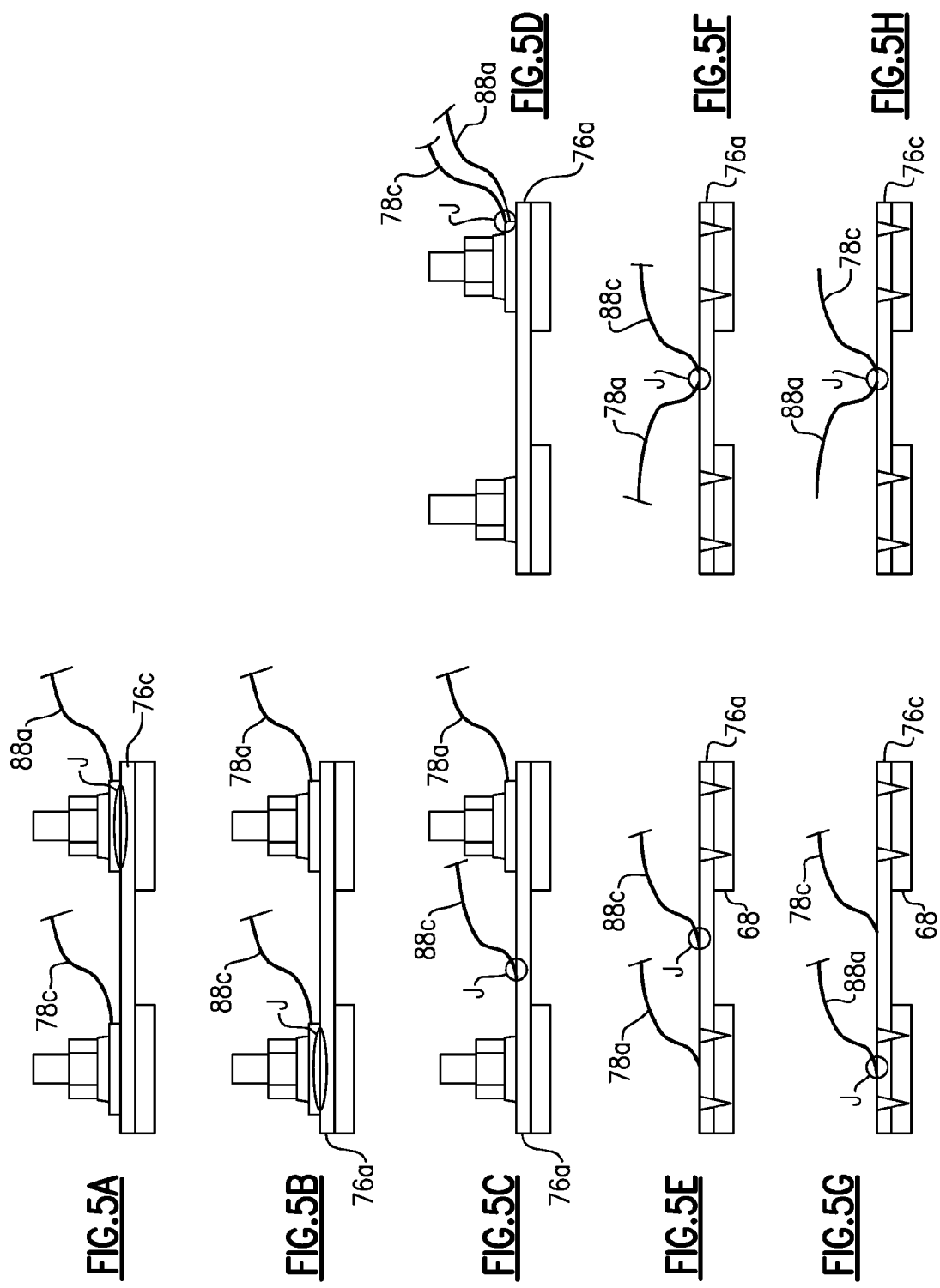

ELECTRIC VEHICLE BATTERY THERMOCOUPLE

CROSS-REFERENCE TO RELATED APPLICATIONS

This application is a divisional of U.S. patent application Ser. No. 14/056,204, which was filed on 17 Oct. 2013 and is incorporated herein by reference.

BACKGROUND

This disclosure relates generally to electric vehicle temperature measurements and, more particularly, to a thermocouple to collect temperature measurements from a battery.

Generally, electric vehicles differ from conventional motor vehicles because electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), and battery electric vehicles (BEVs). Electric vehicles are typically equipped with a battery containing multiple battery cells that store electrical power for powering the electric machine. The battery cells may be charged prior to use, and recharged during a drive by regeneration braking or an internal combustion engine.

Monitoring the temperature of the battery is often necessary. The temperature of the battery is used to, for example, determine how much current can be communicated to or from the battery. The battery may experience a thermal runaway event if the temperature of the battery exceeds a threshold value.

Existing methods of measuring battery temperatures include using thermistors that measure the temperature at a skin of the battery. Other existing methods utilize thermocouples that are separate from the battery. Such thermocouples are entirely separate and distinct from the battery.

SUMMARY

An electric vehicle battery thermocouple according to an exemplary aspect of the present disclosure includes, among other things, a temperature sense lead of a first material, and an electric vehicle battery component of a second material different than the first material.

In a further non-limiting embodiment of the foregoing thermocouple, the electric vehicle battery component comprises a voltage sense lead and a bus bar.

In a further non-limiting embodiment of any of the foregoing thermocouples, the electric vehicle battery component comprises a voltage sense lead and a terminal.

In a further non-limiting embodiment of any of the foregoing thermocouples, the electric vehicle battery component comprises a voltage sense lead.

In a further non-limiting embodiment of any of the foregoing thermocouples, the voltage sense lead is welded to the temperature sense lead.

In a further non-limiting embodiment of any of the foregoing thermocouples, the voltage sense lead and the temperature sense lead are welded to a bus bar.

In a further non-limiting embodiment of any of the foregoing thermocouples, the temperature sense lead is welded to the electric vehicle battery component.

In a further non-limiting embodiment of any of the foregoing thermocouples, the electric vehicle battery thermocouple includes a ring terminal of the temperature sense lead. The ring terminal is clamped to the electric vehicle battery component to couple the temperature sense lead to the electric vehicle battery component.

In a further non-limiting embodiment of any of the foregoing thermocouples, the temperature sense lead is aluminum and the electric vehicle battery component is copper.

In a further non-limiting embodiment of any of the foregoing thermocouples, the temperature sense lead is constantan and the electric vehicle battery component is copper.

In a further non-limiting embodiment of any of the foregoing thermocouples, the electric vehicle battery component comprises a bus bar, a terminal, or both. The bus bar is welded to the terminal.

In a further non-limiting embodiment of any of the foregoing thermocouples, the electric vehicle battery component comprises a bus bar, a terminal, or both. The bus bar is secured to the terminal with a mechanical fastener.

In a further non-limiting embodiment of any of the foregoing thermocouples, including a coating of a third material at a junction between the temperature sense lead and the electric vehicle battery component, the third material different than both the first material and the second material, the third material separating the first material from the second material.

A method of sensing temperature of an electric vehicle battery according to an exemplary aspect of the present disclosure includes, among other things, using a component of an electric vehicle battery as a portion of a thermocouple.

In a further non-limiting embodiment of the foregoing method, the method includes using a temperature sense lead as another portion of the thermocouple.

In a further non-limiting embodiment of any of the foregoing methods, the method includes welding the temperature sense lead to the electric vehicle battery component.

In a further non-limiting embodiment of any of the foregoing methods, the electric vehicle battery component is a bus bar.

In a further non-limiting embodiment of any of the foregoing methods, the method includes welding the bus bar to terminals of the battery.

In a further non-limiting embodiment of any of the foregoing methods, the electric vehicle battery component is a terminal.

In a further non-limiting embodiment of any of the foregoing methods, the electric vehicle battery component is a voltage sense lead.

DESCRIPTION OF THE FIGURES

The various features and advantages of the disclosed examples will become apparent to those skilled in the art from the detailed description. The figures that accompany the detailed description can be briefly described as follows:

FIG. 5A illustrates an example thermocouple junction to monitor temperature of the FIG. 2 battery.

FIG. 5B illustrates another example thermocouple junction to monitor temperature of the FIG. 2 battery.

FIG. 5C illustrates yet another example thermocouple junction to monitor temperature of the FIG. 2 battery.

FIG. 5D illustrates yet another example thermocouple junction to monitor temperature of the FIG. 2 battery.

FIG. 5E illustrates yet another example thermocouple junction to monitor temperature of the FIG. 2 battery.

FIG. 5F illustrates yet another example thermocouple junction to monitor temperature of the FIG. 2 battery.

FIG. 5G illustrates yet another example thermocouple junction to monitor temperature of the FIG. 2 battery.

FIG. 5H illustrates yet another example thermocouple junction to monitor temperature of the FIG. 2 battery.

DETAILED DESCRIPTION

Figure 1:
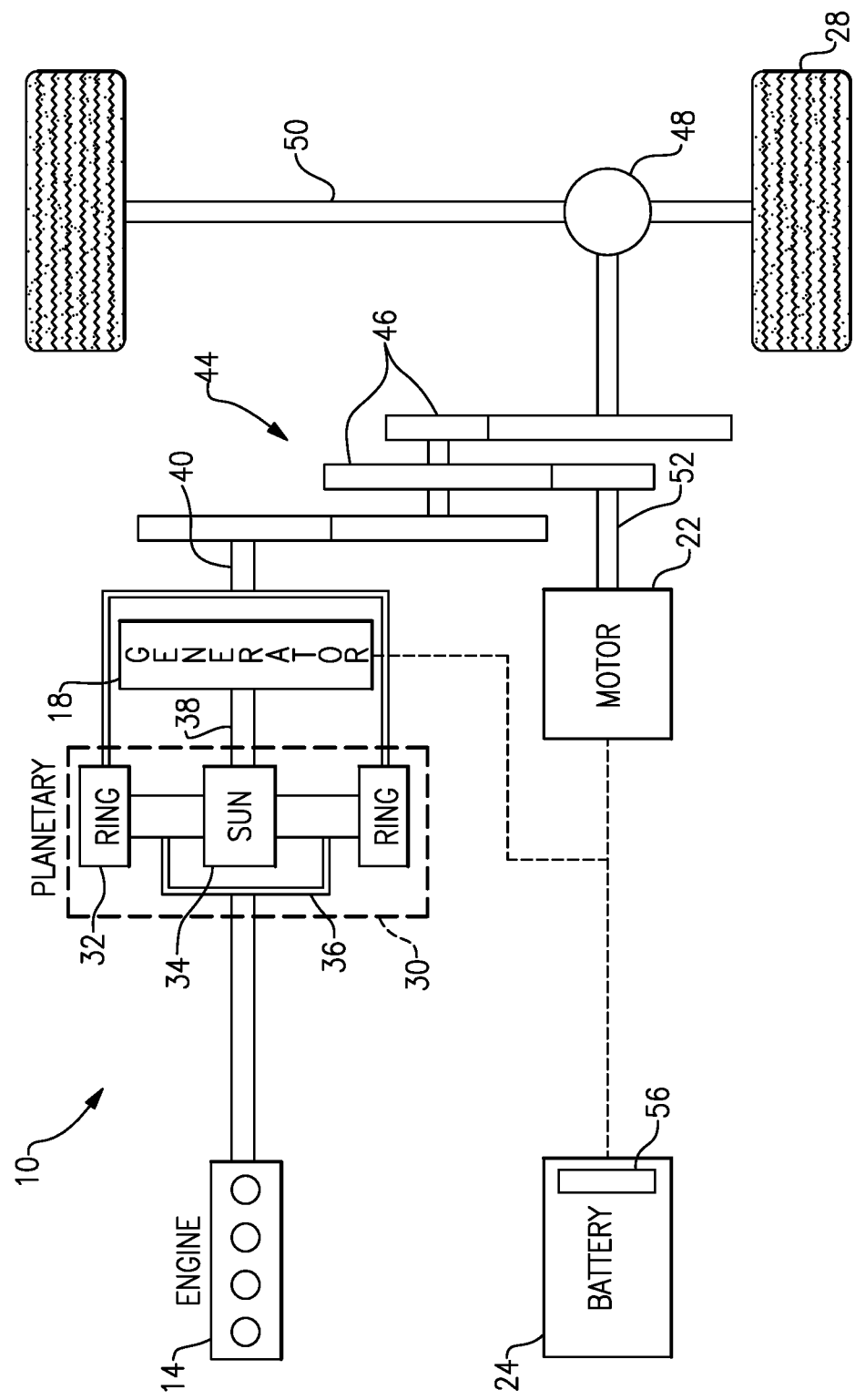
FIG. 1 illustrates a schematic view of an example powertrain architecture for an electric vehicle.

FIG. 1 schematically illustrates a powertrain 10 for an electric vehicle. Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery 24. In this example, the second drive system is considered an electric drive system of the powertrain 10. The first and second drive systems generate torque to drive one or more sets of vehicle drive wheels 28 of the electric vehicle.

The engine 14, which is an internal combustion engine in this example, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery 24.

The battery 24 is an example type of electric vehicle battery assembly. The battery 24 may have the form of a high voltage battery that is capable of outputting electrical power to operate the motor 22 and the generator 18. Other types of energy storage devices and/or output devices can also be used with the electric vehicle having the powertrain 10.

Figure 2:
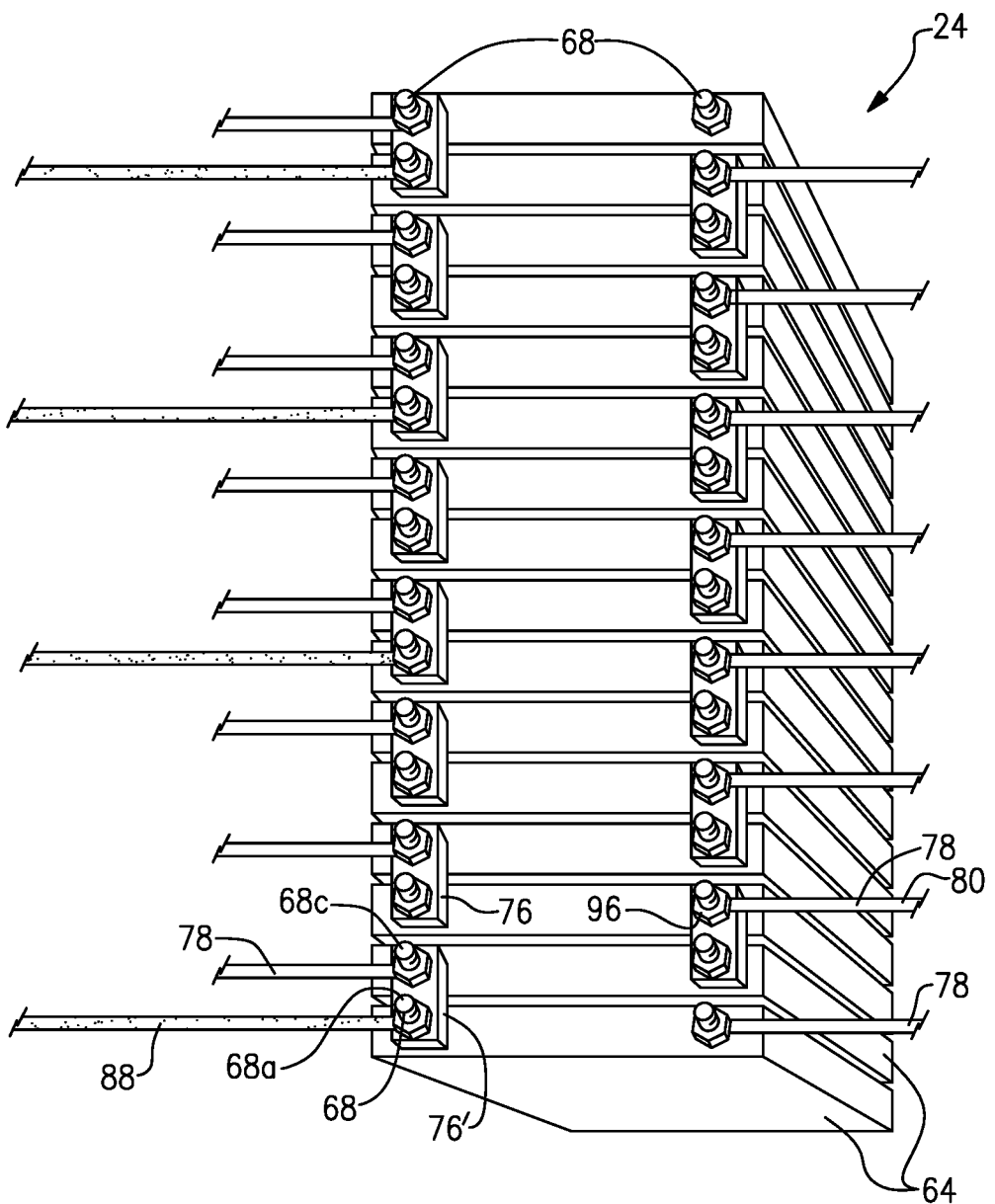
FIG. 2 illustrates a perspective view of an example electric vehicle battery of FIG. 1 having integrated thermocouples.
Figure 3:
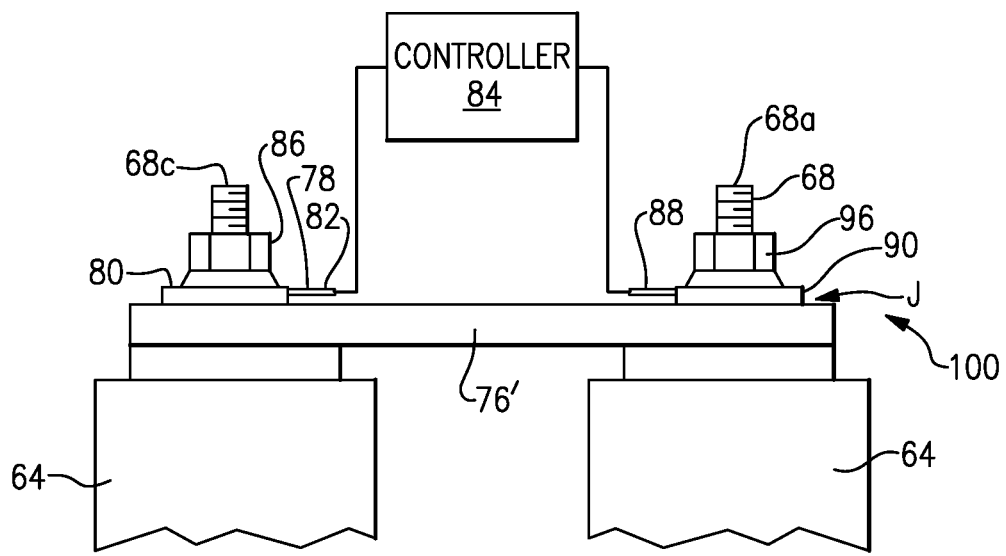
FIG. 3 illustrates a partially schematic and side view of a portion of the electric vehicle battery of FIG. 2.
Figure 4:
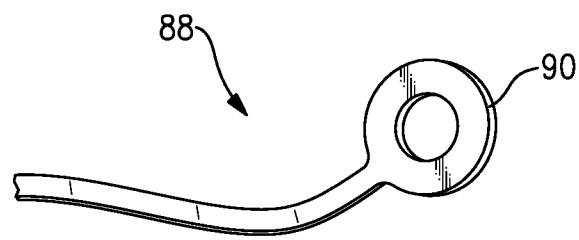
FIG. 4 illustrates a perspective view of a temperature sense lead of an integrated thermocouple in the battery of FIG. 2.

Referring now to FIGS. 2 to 4 with continuing reference to FIG. 1, the battery 24 includes a plurality of battery cells 64. Each of the battery cells 64 includes a pair of terminals 68. In this example, one of the terminals $68_c$ is copper, and one of the terminals $68_a$ is aluminum. Bus bars 76 electrically couple the copper terminal $68_c$ of one of the battery cells 64 to the aluminum terminal $68_a$ of an adjacent battery cell 64.

Voltage sense leads 78 are electrically coupled to the bus bars 76 and a controller 84. The voltage sense leads 78 are copper in this example. Information collected by the voltage sense leads 78 is used by the controller 84 to measure voltage drop between adjacent battery cells 64. The battery 24 generally includes the battery cells 64, the bus bars 76, and the voltage sense leads 78.

The example voltage sense leads 78 include a ring terminal 80 crimped to a wire 82. A mechanical fastener, such as a nut 86, holds the ring terminal 80 of the voltage sense leads 78 against one of the bus bars 76'.

In this example, temperature sense leads 88 are provided in addition to the voltage sense leads 78. The temperature sense leads 88 are coupled to the controller 84 and the battery 24. At the battery 24, the temperature sense leads 88 may connect to the terminal 68, the bus bars 76, or both the terminal 68 and the bus bars 76.

The temperature sense leads 88 may include a ring terminal 90 that is received over the terminal 68a and secured against the bus bar 76' with a mechanical fastener, such as another nut 96. The nut 96 securing the ring terminal 94 secures the bus bar 76' relative to the terminal 68a. The temperature sense leads 88 are secured to the battery 24 at points where temperature measurements are desired.

The temperature sense leads 88 are aluminum in this example. The temperature sense leads 88 and the voltage sense leads 88 are thus made of different materials. The temperature sense leads 88 and the voltage sense leads 88 provide portions of thermocouples 90.

The voltage sense leads 78 are an electric vehicle battery component. The thermocouples 90 may further comprise an additional electric vehicle battery component such as the terminal 68, the bus bar 76, or some other portion of the battery 24. The additional electric vehicle battery component effectively extends the length of the voltage sense leads 78 or the temperature sense leads 88.

The thermocouple 100 includes a first branch having the voltage sense lead 78 and a second branch having the temperature sense lead 88. In this example, the bus bar 76' forms a portion of the first branch. The bus bar 76' is copper like the example voltage sense lead 78. The bus bar 76' is effectively an extension of the voltage sense lead 78.

A junction J represents the interface between the dissimilar materials for one of the thermocouples 90. The junction J is positioned in the area of the battery 24 where a temperature measurement is desired. In this example, the junction J is where the copper bus bar 76' of the first branch contacts the aluminum of the temperature sense lead 88 of the second branch.

A first voltage is developed across the first branch due to a temperature differential between the junction J and the controller 84. A second voltage is developed across the second branch due to a temperature differential between the junction J and the controller 84. The first voltage is different than the second voltage due to the dissimilar materials of the voltage sense leads 78 and the temperature sense leads 88.

A temperature at the junction J can then be determined by measuring the difference in voltages and using the thermoelectric properties of the dissimilar materials. A person having skill in this art and the benefit of this disclosure would understand how to determine a temperature at the junction using the voltage measurements across the voltage sense lead 78 and temperature sense lead 88.

In this example, the bus bar 76' forms a portion of the thermocouple 100. The bus bar 76' is part of the battery 24. The thermocouple 100 using the bus bar 76' is thus considered integrated with the battery 24.

In another example, one or more of the terminals 68 forms a portion of the thermocouple 100. The terminals 68 are part of the battery 24. The thermocouple 100 using one or more of the terminals 68 is thus considered integrated with the battery 24.

In still other examples, the voltage sense lead 78, without the bus bar 76 or the temperature sense lead 88, forms a portion of the thermocouple 100. The voltage sense lead 78 is part of the battery 24. The thermocouple 100 using the voltage sense lead is thus considered integrated with the battery 24

In the prior art, thermocouples are used to sense temperature. These prior art thermocouples are separate and distinct from a battery.

In the examples of FIGS. 5A-5H, examples of various junctions J are shown. The junctions J are portions of other example thermocouples.

In FIG. 5A, the junction J is provided between a temperature sense lead 88a that is aluminum and a bus bar 76c that is copper. A voltage sense lead 78c that is copper and the bus bar 76c provide a branch of the thermocouple in FIG. 5A.

In FIG. 5B, the junction J is provided between a temperature sense lead 88c that is copper and a bus bar 76a that is aluminum. The temperature sense lead 88c in FIG. 5B includes a ring terminal for securing the temperature sense lead 88c relative to the bus bar 76a. A voltage sense lead 78a that is aluminum and the bus bar 76a provide a branch of the thermocouple in FIG. 5B.

In FIG. 5C, the junction J is provided between the temperature sense lead 88c that is copper and a bus bar 76a that is aluminum. The temperature sense lead 88c in FIG. 5C is welded to the bus bar 76a. A voltage sense lead 78a that is aluminum and the bus bar 76a provide a branch of the thermocouple in FIG. 5C.

In FIG. 5D, the junction J is provided between a temperature sense lead 88a that is aluminum and a voltage sense lead 78c that is copper. The voltage sense lead 78c in FIG. 5D is welded to the temperature sense lead 88c. The temperature sense lead 88a in FIG. 5D includes a ring terminal to couple the temperature sense lead 88a to the bus bar 76a, which is aluminum. The voltage sense lead 78c provides a branch of the thermocouple in FIG. 5D.

In FIG. 5E, the junction J is provided between a temperature sense lead 88c that is welded to a bus bar 76a. The bus bar 76a is welded to the terminals 68 in FIG. 5E. Ultrasonic and laser welding are two example welding methods that could be used to secure bus bars to the terminals. Other welding methods could also be used. A voltage sense lead 78a that is aluminium and the bus bar 76a provide a branch of the thermocouple in FIG. 5E.

In FIG. 5F, the junction J is provided between a temperature sense lead 88c that is copper and a voltage sense lead 78a that is aluminum. Both the temperature sense lead 88c and voltage sense lead 78a are welded to a bus bar 76a that is aluminum. The bus bar 76a is welded to the terminals 68 in FIG. 5F. The junction J is provided between the voltage sense lead 88a and the temperature sense lead 88c, the bus bar 76a, or both. The voltage sense lead 78a provides a branch of the thermocouple in FIG. 5F.

In FIG. 5G, the junction J is provided between a temperature sense lead 88a that is aluminum and a bus bar 76c that is copper. The temperature sense lead 88a is welded to the bus bar 76c. The bus bar 76c is welded to the terminals 68 in FIG. 5G. A voltage sense lead 78c that is copper and the bus bar 76c provide a branch of the thermocouple in FIG. 5G.

In FIG. 5H, the junction J is between a temperature sense lead 88a that is aluminum and a voltage sense lead 78c that is copper. In FIG. 5H, the temperature sense lead 88a and the voltage sense lead 78c are both welded to a bus bar 76c that is copper. The temperature sense lead 88a is also welded to the voltage sense lead 78c. The junction J is provided between the voltage sense lead 88c and the temperature sense lead 88a, the bus bar 76c, or both. The voltage sense lead 78c provides a branch of the thermocouple in FIG. 5H.

In other examples, constantan, is used instead of the aluminum or copper. Other combinations of wires and materials could also be used to form the thermocouple 100 and would fall within the scope of this disclosure.

Further, the components of the thermocouple may be partially or entirely coated with a material such as tin. Components commonly coated include the ring terminals 80 and 90, and the bus bar 96. The coating does not impact the thermocouple. In such examples, the base material, not the coating, provides a portion of the branch of the thermocouple. The coating may separate the material of the first branch of the thermocouple from the material of the second branch of the thermocouple.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:
1. A method of sensing a temperature of an electric vehicle battery, comprising:
   using an electric vehicle battery component as a portion of a thermocouple; and
   using the thermocouple when sensing the temperature.
2. The method of claim 1, further comprising using a temperature sense lead as another portion of the thermocouple.

3. The method of claim 2, further comprising welding the temperature sense lead to the electric vehicle battery component.

4. The method of claim 2, further comprising clamping a ring terminal of the temperature sense lead to the electric vehicle battery component to couple the temperature sense lead to the electric vehicle battery component.

5. The method of claim 2, wherein the temperature sense lead is a first material and the electric vehicle battery component is a second, different material.

6. The method of claim 5, wherein the temperature sense lead is aluminum or constantan, and the electric vehicle battery component is copper.

7. The method of claim 5, further comprising coating a junction between the temperature sense lead and the electric vehicle battery component with a third material that different than both the first material and the second material, the third material separating the first material from the second material.

8. The method of claim 5, wherein the first material interfaces with the second material at a junction, and the method further comprises providing a temperature measurement at the junction using the thermocouple.

9. The method of claim 1, wherein the electric vehicle battery component is a bus bar.

10. The method of claim 9, further comprising welding the bus bar to a terminal of an electric vehicle battery.

11. The method of claim 1, wherein the electric vehicle battery component is a terminal.

12. The method of claim 2, wherein the electric vehicle battery component is a voltage sense lead.

13. The method of claim 12, further comprising welding the voltage sense lead to the temperature sense lead.

14. The method of claim 13, further comprising welding the voltage sense lead and the temperature sense lead to a bus bar.

15. The method of claim 1, further comprising a bus bar and a terminal, wherein the electric vehicle battery component comprises the bus bar, the terminal, or both, and the bus bar is secured to the terminal with a mechanical fastener.

16. A method of sensing a temperature of an electric vehicle battery, comprising:
estimating a temperature at a junction between a temperature sense lead and a component of the electric vehicle battery based on at least a difference between a first and second voltage, the first voltage developed across a first branch of a thermocouple that includes the temperature sense lead, the second voltage developed across a second branch of the thermocouple that includes the component.

17. The method of claim 16, wherein the temperature sense lead and the component are dissimilar materials.

18. A method, comprising:
establishing a thermocouple using an electric vehicle battery component of a first material and a temperature sense lead of a second, different material; and
using the thermocouple when estimating a temperature.

19. The method of claim 18, further comprising using the thermocouple when estimating the temperature at a junction between the electric vehicle battery component and the temperature sense lead.

* * * * *